United States Patent
Zong et al.

(10) Patent No.: US 10,666,375 B2
(45) Date of Patent: May 26, 2020

(54) SIGNAL MONITORING METHOD AND APPARATUS FOR WAVELENGTH SELECTIVE SWITCH WSS

(71) Applicant: Huawei Technologies Co., Ltd., Shenzhen, Guangdong, P.R. (CN)

(72) Inventors: Liangjia Zong, Dongguan (CN); Han Zhao, Dongguan (CN); Zhiyong Feng, Dongguan (CN); Yunfei Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/285,022

(22) Filed: Feb. 25, 2019

(65) Prior Publication Data
US 2019/0199464 A1 Jun. 27, 2019

Related U.S. Application Data

(63) Continuation of application No. PCT/CN2016/097000, filed on Aug. 26, 2016.

(51) Int. Cl.
*H04J 14/02* (2006.01)
*G02B 6/293* (2006.01)
(Continued)

(52) U.S. Cl.
CPC ........ *H04J 14/0212* (2013.01); *G02B 6/2938* (2013.01); *G02B 26/06* (2013.01);
(Continued)

(58) Field of Classification Search
None
See application file for complete search history.

(56) References Cited

U.S. PATENT DOCUMENTS

2007/0237451 A1* 10/2007 Colbourne ......... G02B 6/12007
385/18
2008/0298738 A1 12/2008 Ishikawa et al.
(Continued)

FOREIGN PATENT DOCUMENTS

| CN | 102135647 A | 7/2011 |
| CN | 102590953 A | 7/2012 |

(Continued)

OTHER PUBLICATIONS

Peter Evans et al, "LCOS-based WSS with true integrated channel monitor for signal quality monitoring applications in ROADMs," OFC/NFOEC 2008—2008 Conference on Optical Fiber Communication/National Fiber Optic Engineers Conference, May 23, 2008, 3 pages.

*Primary Examiner* — Darren E Wolf
(74) *Attorney, Agent, or Firm* — Kilpatrick Townsend & Stockton LLP

(57) ABSTRACT

A signal monitoring method and apparatus for a wavelength selective switch (WSS) are provided. The signal monitoring method for a wavelength selective switch WSS includes: encoding a phase of a first optical engine based on an input WDM signal, so that the WDM signal is split into a transmitted signal and a monitored signal after passing through the first optical engine; inputting the monitored signal to a second optical engine disposed at an output-side grating; and controlling the second optical engine to rotate in a wavelength plane of the WDM signal, so that monitored light of a specified wavelength in the monitored signal is output from the second optical engine at a preset angle.

11 Claims, 9 Drawing Sheets

(51) Int. Cl.
  *G02B 26/06* (2006.01)
  *H04Q 11/00* (2006.01)
(52) U.S. Cl.
  CPC ..... *H04Q 11/0005* (2013.01); *H04Q 11/0062* (2013.01); *H04Q 2011/0015* (2013.01); *H04Q 2011/0016* (2013.01); *H04Q 2011/0083* (2013.01)

(56) References Cited

U.S. PATENT DOCUMENTS

| | | | |
|---|---|---|---|
| 2009/0220233 A1* | 9/2009 | Presley | G02B 6/3518 398/79 |
| 2012/0057869 A1* | 3/2012 | Colbourne | H04J 14/0212 398/49 |
| 2015/0263477 A1 | 9/2015 | Onaka | |
| 2016/0165324 A1 | 6/2016 | Zhao et al. | |
| 2016/0211912 A1 | 7/2016 | Liu et al. | |
| 2017/0041689 A1 | 2/2017 | Yan et al. | |

FOREIGN PATENT DOCUMENTS

| | | |
|---|---|---|
| CN | 104756422 A | 7/2015 |
| EP | 3043495 A1 | 7/2016 |
| WO | 2015024238 A1 | 2/2015 |
| WO | 2015161452 A1 | 10/2015 |

* cited by examiner

SIGNAL MONITORING METHOD AND APPARATUS FOR WAVELENGTH SELECTIVE SWITCH WSS

CROSS-REFERENCE TO RELATED APPLICATIONS

This application is a continuation of International Application No. PCT/CN2016/097000, filed on Aug. 26, 2016, the disclosure of which is hereby incorporated by reference in its entirety.

TECHNICAL FIELD

The present application relates to the field of network communications technologies, and in particular, to a signal monitoring method and apparatus for a wavelength selective switch (WSS).

BACKGROUND

With rapid increase of network traffic and bandwidth, operators have increasingly urgent requirements on intelligent scheduling functions of underlying wavelength division networks. Therefore, reconfigurable optical add/drop multiplexers (ROADM) are gradually adopted in an increasing number of high-end operators' networks. After the ROADM is introduced into a network, an operator can provide a wavelength-level service soon, thereby facilitating network planning to reduce operation costs, and facilitating maintenance to reduce maintenance costs.

On the other hand, in an optical communications long-haul transmission network, optical-electrical-optical (OEO) conversion in a link of a system tends to be reduced. Therefore, it becomes increasingly difficult to convert an optical signal to an electrical signal and then detect a bit error rate of a transmitted signal at an electrical layer, and testing the bit error rate only on a termination of the link is disadvantageous to fault locating. With an increased transmission capacity and improved flexibility in an optical network, system complexity becomes higher. To effectively control and manage the optical network, it becomes more important to monitor an optical signal for high-speed dense wavelength division multiplexing (DWDM) in the network.

Optical signal monitoring covers a plurality of aspects. For example, optical power monitoring can reflect a basic working status of a channel and instruct a system to perform automatic power equilibrium; optical signal-noise-ratio (OSNR) monitoring can relatively accurately reflect signal quality; dispersion monitoring can reflect a dispersion status of the channel to instruct the system to perform dispersion compensation on an optical layer or an electrical layer. These parameters are important for optical performance monitoring, facilitate impairment suppression, fault locating, degradation detection, backup, and recovery of the optical network, and are beneficial to stable working of the optical network. Optical signal monitoring is indispensable to all important network elements in the network. Therefore, it is very necessary to monitor a transmitted signal in real time by using an ROADM site.

A wavelength selective switch (WSS) is a technical option of current ROADM. For a 1×N WSS, 1 refers to a common (COM) port, and N represents branch ports. Operation of the WSS is as follows: When a group of wavelength division multiplexing (WDM) signals enter from the COM port, the group of WDM signals are separated based on optical wavelengths, and then each wavelength is routed to one of the N branch ports based on a system requirement. Oppositely, an optical signal can be received, as input, from the N branch ports, and can be sent, as output, from the COM port.

An LCoS-WSS-based signal monitoring solution is provided in the prior art. In this solution, a single flare on a liquid crystal on silicon (LCoS) is divided into an optical monitoring area and a WSS signal switching area for separate processing. For example, if a flare occupies 200 pixels in total in a direction of an output port, 20 of the 200 pixels may be designated as the optical monitoring area, and the remaining 180 pixels are designated as the WSS signal switching area.

However, in the foregoing solution in the prior art, when monitored light is processed, phase information of the LCoS also needs to be continuously updated, to obtain different wavelength channels through filtering in a time-sharing manner for detection and monitoring. A scanning update speed of the LCoS is usually approximately 100 ms. If 80 channels in a band C need to be scanned, a time period of approximately 10 s is required. For an N×M WSS device including a plurality of ports, a longer time period is required, and a demand for quick fault locating in a future network cannot be satisfied.

SUMMARY

The present disclosure provides a signal monitoring method and apparatus for a wavelength selective switch WSS. The method and the apparatus that are provided in the present disclosure resolve a problem that an optical signal monitoring solution in the prior art is time-consuming and cannot satisfy a demand for quick fault locating in a future network.

According to a first aspect, a signal monitoring method for a wavelength selective switch WSS is provided, where after a WDM signal transmitted from an input port in a WSS passes through an incidence grating, light of wavelengths that is included in the WDM signal is incident to different positions or areas on a first optical engine, and the method includes:

encoding a phase of the first optical engine based on the WDM signal, so that the WDM signal is split into a transmitted signal and a monitored signal after passing through the first optical engine, and the transmitted signal and the monitored signal are output at different emergence angles in a direction of an output port, where the monitored signal is input to a second optical engine disposed at an output-side grating, and energy of the transmitted signal is greater than that of the monitored signal;

determining, in the monitored signal, monitored light of a specified wavelength that currently needs to be monitored; and controlling, based on an incidence angle at which the monitored light is incident to the second optical engine and an emergence angle at which the monitored light is output from the second optical engine, the second optical engine to rotate in a wavelength plane of the WDM signal, so that the monitored light is output from the second optical engine at a preset angle.

In the WSS to which the method provided in the present disclosure is applicable, a second optical engine is further added. The second-stage optical engine is disposed at the output-side grating of the WSS. Light of a particular wavelength that needs to be finally output can be selected by using rotation of the second optical engine in the wavelength plane, so that a processing speed of signal monitoring can be improved without refreshing phase information of the first optical engine while the monitored signal is scanned.

In a possible implementation, the encoding a phase of the first optical engine based on the WDM signal includes:

encoding the phase of the first optical engine by using a formula $\varphi_{splitting}(y, \lambda) = Arg\{C_1(\lambda)I(y)e^{i\varphi_1(y, \lambda)} + C_2(\lambda)I(y)e^{i\varphi_2(y, \lambda)}\}$, where $C_1:C_2$ is an energy ratio of the transmitted signal to the monitored signal, and the function $\varphi_1(y, \lambda)$ and the function $\varphi_2(y, \lambda)$ respectively correspond to output directions of the transmitted signal and the monitored signal.

In the foregoing implementation, the phase of the first optical engine is encoded by using the foregoing formula. The first optical engine on which phase adjustment is performed processes an entire flare of the WDM signal without dividing the flare into two parts for processing. In this way, light splitting processing may be performed on the WDM signal at any ratio, and it is ensured that performance impact, such as insertion loss, on the original signal is minimal.

In another possible implementation, when the wavelength selective switch WSS includes a plurality of input ports, before the monitored signal is input to the second optical engine disposed at the output-side grating, the method further includes:

controlling the monitored signal to pass through a third optical engine, where the third optical engine is disposed between the first optical engine and the second optical engine;

determining, in the plurality of input ports, a first input port corresponding to the monitored light;

determining a first transmitted signal and a first monitored signal that are formed after the WDM signal transmitted from the first input port is split after passing through the first optical engine; and controlling, based on an incidence angle at which the first monitored signal is incident to the third optical engine, the third optical engine to rotate in a port plane, so that the first monitored signal is output to the second optical engine from the third optical engine, and the monitored light that is output from the second optical engine is input to a preset output port.

In another possible implementation, when the wavelength selective switch WSS includes a plurality of input ports, and the monitored light includes signal light of a same wavelength that is included in a plurality of WDM signals input from the plurality of input ports, after the monitored signal is input to the second optical engine disposed at the output-side grating, the method further includes:

controlling the monitored light to pass through a fourth optical engine;

determining, in the plurality of input ports, a second input port to be monitored, and determining, in the monitored light, monitored signal light that is input from the second input port; and controlling, based on an incidence angle at which the monitored signal light is incident to the fourth optical engine, the fourth optical engine to rotate in a port plane, so that the monitored signal light is output from the fourth optical engine and is input to a preset output port.

The foregoing two possible implementations are for a case in which the WSS includes the plurality of input ports. Because of existence of the plurality of input ports, an input port and a wavelength need to be selected for to-be-detected light. According to the foregoing two implementations, light of a particular wavelength that needs to be finally output can be selected by using rotation of the second optical engine in the wavelength plane, so that a processing speed of signal monitoring can be improved without refreshing phase information of the first optical engine while the monitored signal is scanned.

According to a second aspect, a wavelength selective switch WSS is provided. The WSS includes an input port, an incidence grating, an input-end spherical lens, a first optical engine, an output-end spherical lens, an output-side grating, and a plurality of output ports, where the input port is configured to send an input WDM signal to the incidence grating;

the incidence grating is configured to respectively diffract signals of wavelengths in the received WDM signal to the input-end spherical lens at different diffraction angles;

the input-end spherical lens is configured to allow the signals of wavelengths to be incident, in parallel, to different positions or areas on the first optical engine;

the first optical engine is configured to perform phase encoding modulation based on the input port corresponding to the signals of wavelengths, and output the signals of wavelengths to the output-end spherical lens at different angles;

the output-end spherical lens is configured to output the signals of wavelengths to the output grating;

the output grating is configured to output the signals of wavelengths from different the output ports;

the WSS further includes a second optical engine disposed at the output-side grating;

the first optical engine is configured to split a signal of any wavelength in the signals of wavelengths into a transmitted signal and a monitored signal, and output the transmitted signal and the monitored signal at different emergence angles in a direction of the output port, so that the monitored signal is input to the second optical engine; and the second optical engine is configured to determine, in the monitored signal, monitored light of a specified wavelength that currently needs to be monitored, and rotate in a wavelength plane of the WDM signal based on an incidence angle at which the monitored light is incident to the second optical engine and an emergence angle at which the monitored light is output from the second optical engine, so that the monitored light is output from the second optical engine at a preset angle.

In a possible implementation, when there are a plurality of input ports, the WSS further includes:

a third optical engine, where the third optical engine is disposed between the first optical engine and the second optical engine, and is configured to rotate in a port plane based on an incidence angle at which a first monitored signal corresponding to the monitored light is incident to the third optical engine, so that the first monitored signal is output to the second optical engine from the third optical engine, and the monitored light that is output from the second optical engine is input to a preset output port.

In another possible implementation, when there are a plurality of input ports, and the monitored light includes signal light of a same wavelength that is included in a plurality of WDM signals input from the plurality of input ports, the WSS further includes:

a fourth optical engine, where the fourth optical engine is disposed between the output-end spherical lens and the output port, and is configured to rotate in a port plane based on an incidence angle at which monitored signal light is incident to the fourth optical engine, so that the monitored signal light is output and is input to a preset output port, where the monitored signal light is in the monitored light and is input from a second input port to be monitored.

According to a third aspect, a signal monitoring apparatus for a wavelength selective switch WSS is provided. The apparatus includes a WSS and a processor, where the WSS specifically includes an input port, an incidence grating, an input-end spherical lens, a first optical engine, an output-end spherical lens, an output-side grating, and an output port, and the WSS further includes a second optical engine disposed at the output-side grating, where the second optical engine is configured to sift out monitored light of a specified wavelength to be monitored; and the processor is configured to: encode a phase of the first optical engine based on a WDM signal transmitted from the input port, so that the WDM signal is split into a transmitted signal and a monitored signal after passing through the first optical engine, and the transmitted signal and the monitored signal are output at different emergence angles in a direction of the output port, where the monitored signal is input to the second optical engine, and energy of the transmitted signal is greater than that of the monitored signal; determine, in the monitored signal, the monitored light of the specified wavelength that currently needs to be monitored; and control, based on an incidence angle at which the monitored light is incident to the second optical engine and an emergence angle at which the monitored light is output from the second optical engine, the second optical engine to rotate in a wavelength plane of the WDM signal, so that the monitored light is output from the second optical engine at the emergence angle.

In a possible implementation, the processor is further configured to:

encode the phase of the first optical engine by using a formula $\varphi_{splitting}(y, \lambda) = \mathrm{Arg}\{C_1(\lambda)I(y)e^{i\varphi_1(y, \lambda)} + C_2(\lambda)I(y)e^{i\varphi_2(y, \lambda)}\}$, where $C_1:C_2$ is an energy ratio of the transmitted signal to the monitored signal, and the function $\varphi_1(y, \lambda)$ and the function $\varphi_2(y, \lambda)$ respectively correspond to output directions of the transmitted signal and the monitored signal.

In another possible implementation, when the WSS includes a plurality of input ports, the WSS further includes a third optical engine, where the third optical engine is disposed between the first optical engine and the second optical engine, where the apparatus includes:

the processor is further configured to: before controlling the monitored signal to be input to the second optical engine disposed at the output-side grating, control the monitored signal to pass through the third optical engine; determine, in the plurality of input ports, a first input port corresponding to the monitored light; determine a first transmitted signal and a first monitored signal that are formed after the WDM signal transmitted from the first input port is split after passing through the first optical engine; and control, based on an incidence angle at which the first monitored signal is incident to the third optical engine, the third optical engine to rotate in a port plane, so that the first monitored signal is output to the second optical engine from the third optical engine, and the monitored light that is output from the second optical engine is output to a preset output port.

In another possible implementation, when the WSS includes a plurality of input ports and the monitored light include signal light of a same wavelength that is included in a plurality of WDM signals input from the plurality of input ports, the WSS further includes a fourth optical engine, where the fourth optical engine is disposed between the output-end spherical lens and the output port, where the apparatus includes:

after controlling the monitored signal to be input to the second optical engine disposed at the output-side grating, the processor is further configured to: control the monitored light to pass through the fourth optical engine; determine, in the plurality of input ports, a second input port to be monitored, and determine, in the monitored light, monitored signal light that is input from the second input port; and control, based on an incidence angle at which the monitored signal light is incident to the fourth optical engine, the fourth optical engine to rotate in a port plane, so that the monitored signal light is output from the fourth optical engine and is input to a preset output port.

One or two of the foregoing technical solutions have at least the following technical effects:

In the WSS to which the method provided in the embodiments of the present disclosure is applicable, a second-stage optical engine is further added. The second-stage optical engine is disposed at the output-side grating of the WSS. Light of a particular wavelength that needs to be finally output can be selected by using rotation of the second optical engine in the wavelength plane, so that a processing speed of signal monitoring can be improved without refreshing phase information of the first optical engine while the monitored signal is scanned.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The following further describes the embodiments of the present disclosure in detail with reference to the accompanying drawings of this specification.

Embodiment 1

Figure 1A:
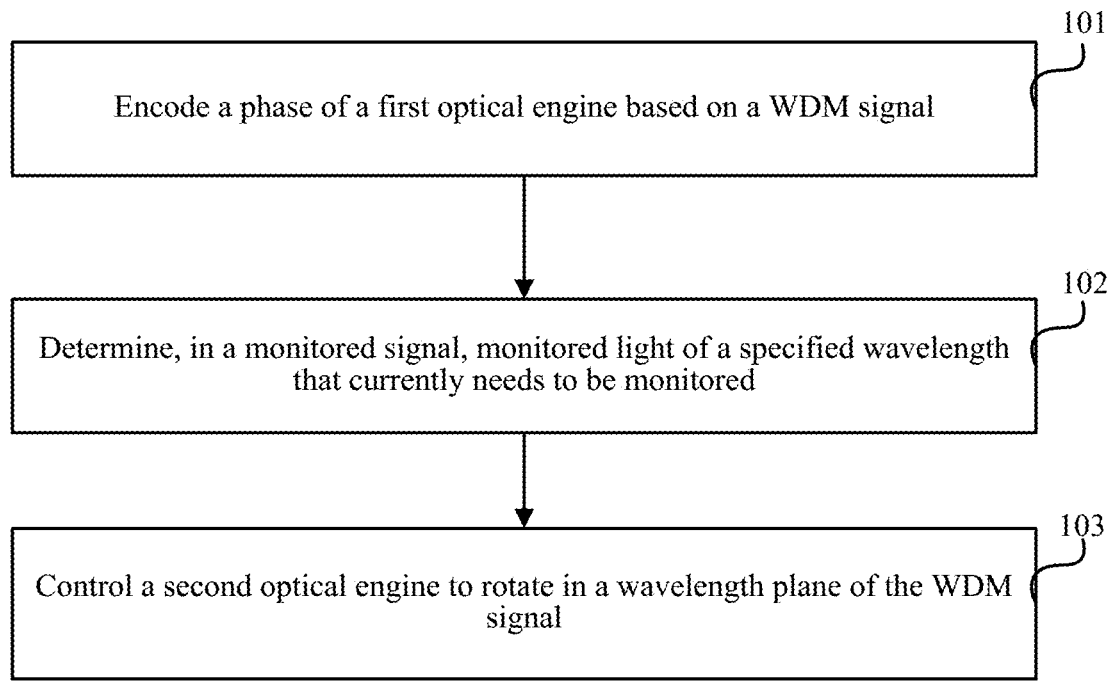
FIG. 1a is a schematic flowchart of a signal monitoring method for a wavelength selective switch WSS according to an embodiment of the present disclosure.

As shown in FIG. 1a, an embodiment of the present disclosure provides a signal monitoring method for a wavelength selective switch WSS. In the method, after a wavelength division multiplexing (WDM) signal transmitted from an input port in a WSS passes through an incidence grating, light of wavelengths that is included in the WDM signal is incident to different positions or areas on a first optical engine. The method specifically includes the following steps.

Step 101: Encode a phase of the first optical engine based on the WDM signal, so that the WDM signal is split into a transmitted signal and a monitored signal after passing through the first optical engine, and the transmitted signal and the monitored signal are output at different emergence angles in a direction of an output port, where the monitored signal is input to a second optical engine disposed at an output-side grating, and energy of the transmitted signal is greater than that of the monitored signal.

Light of different wavelengths that is in the WDM signal is incident, in parallel, to different areas on the first optical engine after the WDM signal passes through the incidence grating. Phase processing is performed on the first optical engine, so that flare energy corresponding to a wavelength can be split into two parts (which respectively correspond to a transmitted signal part and a monitored signal part) for separate output. A larger part of the energy is concentrated in an output direction of the signal (that is, the transmitted signal part), and a direction of the other part, a smaller part, of the energy is an output direction of a monitoring port (that is, the monitored signal part), so that impact of division of the monitored signal on signal transmission is minimized.

Step 102: Determine, in the monitored signal, monitored light of a specified wavelength that currently needs to be monitored.

Step 103: Control, based on an incidence angle at which the monitored light is incident to the second optical engine and an emergence angle at which the monitored light is output from the second optical engine, the second optical engine to rotate in a wavelength plane of the WDM signal, so that the monitored light is output from the second optical engine at a preset angle.

In this embodiment of the present disclosure, the wavelength plane is a plane in which signal light of different wavelengths that is included in the WDM signal is spread out at different angles after the WDM signal passes through the incidence grating.

A second-stage optical engine (where the second optical engine may be a single MEMS micromirror) is further added to a WSS to which the method provided in this embodiment of the present disclosure is applicable. The second-stage optical engine is disposed at the output-side grating of the WSS. When light of signals of different wavelengths is incident to the second optical engine at different angles, the second optical engine is controlled to rotate in the wavelength plane, so that monitored light corresponding to different wavelengths is output in a time-sharing manner. Light of a particular wavelength that needs to be finally output can be selected by using rotation of the second optical engine in the wavelength plane. Therefore, it is only needed to quickly rotate the second optical engine in a wavelength direction to implement a quick signal monitoring function without refreshing phase information of the first optical engine while the monitored signal is scanned.

In this embodiment of the present disclosure, the first optical engine on which phase adjustment is performed processes an entire flare of the WDM signal without dividing the flare into two parts for processing. In this way, light splitting processing may be performed on the WDM signal at any ratio, and it is ensured that performance impact, such as insertion loss, on the original signal is minimal. A specific implementation of encoding the phase of the first optical engine based on the WDM signal may be:

When light of a signal of a specific wavelength is incident to an area on the first optical engine, a phase of the area is encoded, so that a flare in the area is output at a particular light splitting ratio in a particular direction. For example, the phase of the first optical engine is encoded by using a formula $\varphi_{splitting}(y, \lambda) = \text{Arg}\{C_1(\lambda)I(y)e^{i\varphi_1(y, \lambda)} + C_2(\lambda)I(y)e^{i\varphi_2(y, \lambda)}\}$.

$C_1:C_2$ is an energy ratio of the transmitted signal to the monitored signal. The function $\varphi_1(y, \lambda)$ and the function $\varphi_2(y, \lambda)$ respectively correspond to the output directions of the transmitted signal and the monitored signal. After the WDM signal is under the action of the phase function $\varphi_1(y, \lambda)$ and the energy ratio when passing through the first optical engine, a first part in the WDM signal, as the transmitted signal, is output in a first direction without being split. After the WDM signal is under the action of the phase function $\varphi_2(y, \lambda)$ and the energy ratio when passing through the first optical engine, a second part in the WDM signal other than the first part, as the monitored signal, is output in a second direction without being split. The first direction is different from the second direction.

In a specific application example, the WSS includes N output ports. If it is set that the first to the $(N-1)^{th}$ output ports are configured to output the transmitted signal and the $N^{th}$ port is configured to output the monitored signal, the output direction of the transmitted signal corresponding to $\varphi_1(y, \lambda)$ is a direction of the first to the $(N-1)^{th}$ output ports, and the output direction of the monitored signal corresponding to $\varphi_2(y, \lambda)$ is a direction of the $N^{th}$ output port.

Figure 1B:
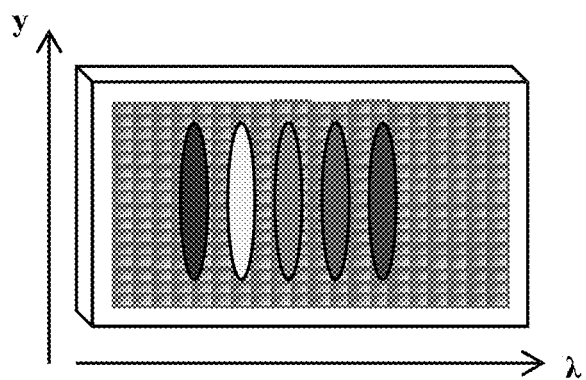
FIG. 1b is a diagram of a light splitting effect after phase encoding is performed on a first optical engine by using specific a composite phase in a method according to an embodiment of the present disclosure.

The function $\varphi_1(y, \lambda)$ and the function $\varphi_2(y, \lambda)$ respectively correspond to the output directions of the transmitted signal and the monitored signal. Therefore, when the first optical engine loads a composite phase $\varphi_{splitting}(y, \lambda) = \text{Arg}\{C_1(\lambda)I(y)e^{i\varphi_1(y, \lambda)} + C_2(\lambda)I(y)e^{i\varphi_2(y, \lambda)}\}$, a light splitting effect (as shown in FIG. 1b) can be achieved.

Figure 1C:
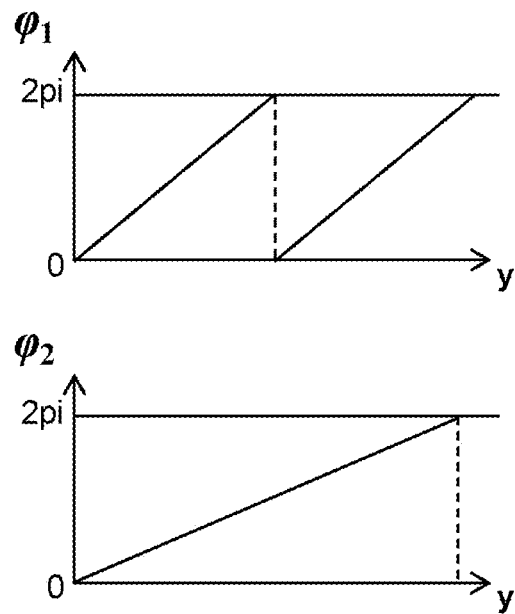
FIG. 1c is a schematic diagram of phase variations of a function $\varphi_1$ and a function $\varphi_2$ in a composite phase.

In addition, $\varphi_1(y, \lambda)$ and $\varphi_2(y, \lambda)$ are usually linear phases varying from 0 to 2 pi (where phase variations of $\varphi_1$ and $\varphi_2$ are shown in FIG. 1c). A speed (a cycle) of the phase variation decides a direction of emergent light.

Figure 2A:
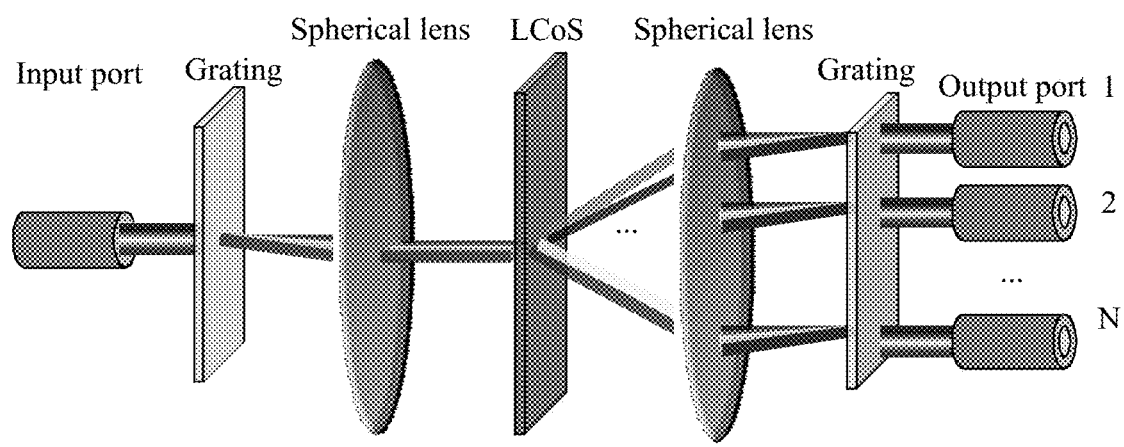
FIG. 2a is a schematic principle diagram of a basic optical path in a 1×N WSS structure in the prior art.

In a specific application environment, the WSS includes a plurality of implementation structures, generally including: (1) one WSS includes one input port and a plurality of output ports, namely, single-input multiple-output (1×N WSS); (2) one WSS includes a plurality of input ports and a plurality of output ports, namely, multiple-input multiple-output (N×M WSS). When the method provided in this embodiment of the present disclosure is applied to different WSS structures, specific implementations are different. The specific implementations are as follows:

First, when the method provided in this embodiment of the present disclosure is applied to a 1×N WSS structure, a specific implementation may be:

A schematic principle diagram of a basic optical path in a 1×N WSS structure in the prior art is shown in FIG. 2a. After a WDM signal (where the signal includes a plurality of signals of different wavelengths, namely, is a multi-wavelength signal) passes through an optical fiber array (including a collimation lens), the WDM signal enters an incidence grating. The incidence grating diffracts the multi-wavelength signal at different diffraction angles. After passing through a spherical lens, the signals in the multi-wavelength signal are incident, in parallel, to different positions or areas on a switching engine LCoS (that is, the first optical engine in Embodiment 1). Subsequently, phase encoding modulation is performed on the LCoS based on output ports of signals of different wavelengths, and light of different wavelengths is output at different angles. Next, the signals of wavelengths are output through different emergence ports by sequentially passing through a spherical lens and an output-side grating.

Figure 2B:
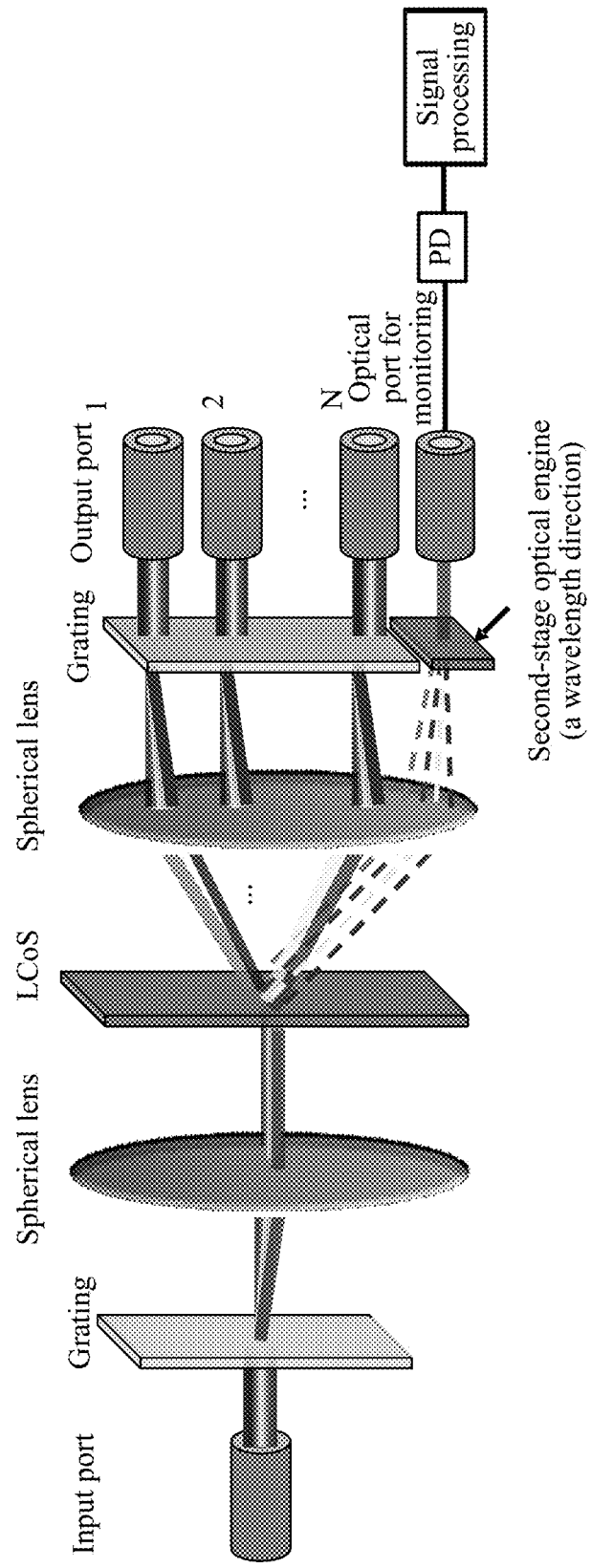
FIG. 2b is a schematic principle diagram of a basic optical path in a 1×N WSS structure to which a method is applicable according to the present disclosure.
Figure 2C:
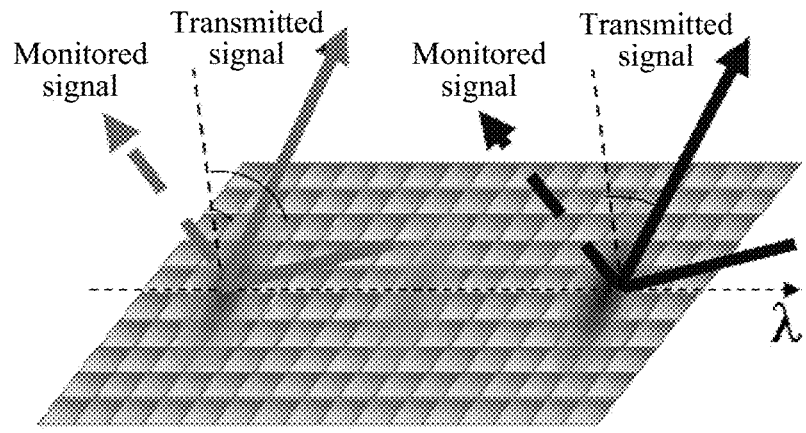
FIG. 2c is a schematic diagram of light splitting performed by a first optical engine in a method according to the present disclosure.

In this solution provided in this embodiment of the present disclosure, the second optical engine is added based on the original 1×N WSS structure. A schematic structural diagram of a 1×N WSS structure provided in an embodiment of the present disclosure after adjustment is shown in FIG. 2b. Signal processing manners in the method provided in this embodiment of the present disclosure that are performed before the optical engine and after the second optical engine are all the same as those in the prior art. Processing procedures in the first optical engine, in the second optical engine, and between the first optical engine and the second optical engine may be:

Light of different wavelengths is incident, in parallel, to different areas on the first optical engine (where the first optical engine may be an LCoS). Phase processing is performed on the LCoS, so that flare energy corresponding to a specific wavelength is split into two parts for separate output. A larger part of the energy is concentrated in an output direction of the signal, and a direction of the other part, a smaller part, of the energy is an output direction of a monitoring port (as shown in FIG. 2c).

After the transmitted signal and the monitored signal that are output from the first optical engine passes through the spherical lens, the transmitted signal is input to the output-side grating, and the monitored signal is input to the added second optical engine, so that the second optical engine sifts out, from the monitored signal, monitored light of a particular wavelength that currently needs to be monitored.

Figure 3A:
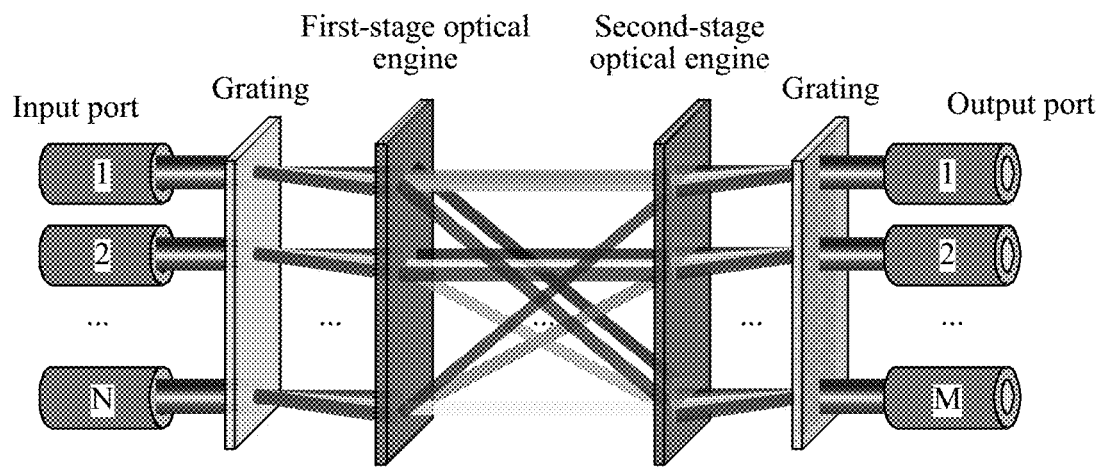
FIG. 3a is a schematic principle diagram of a basic optical path in an N×M WSS structure in the prior art.
Figure 3B:
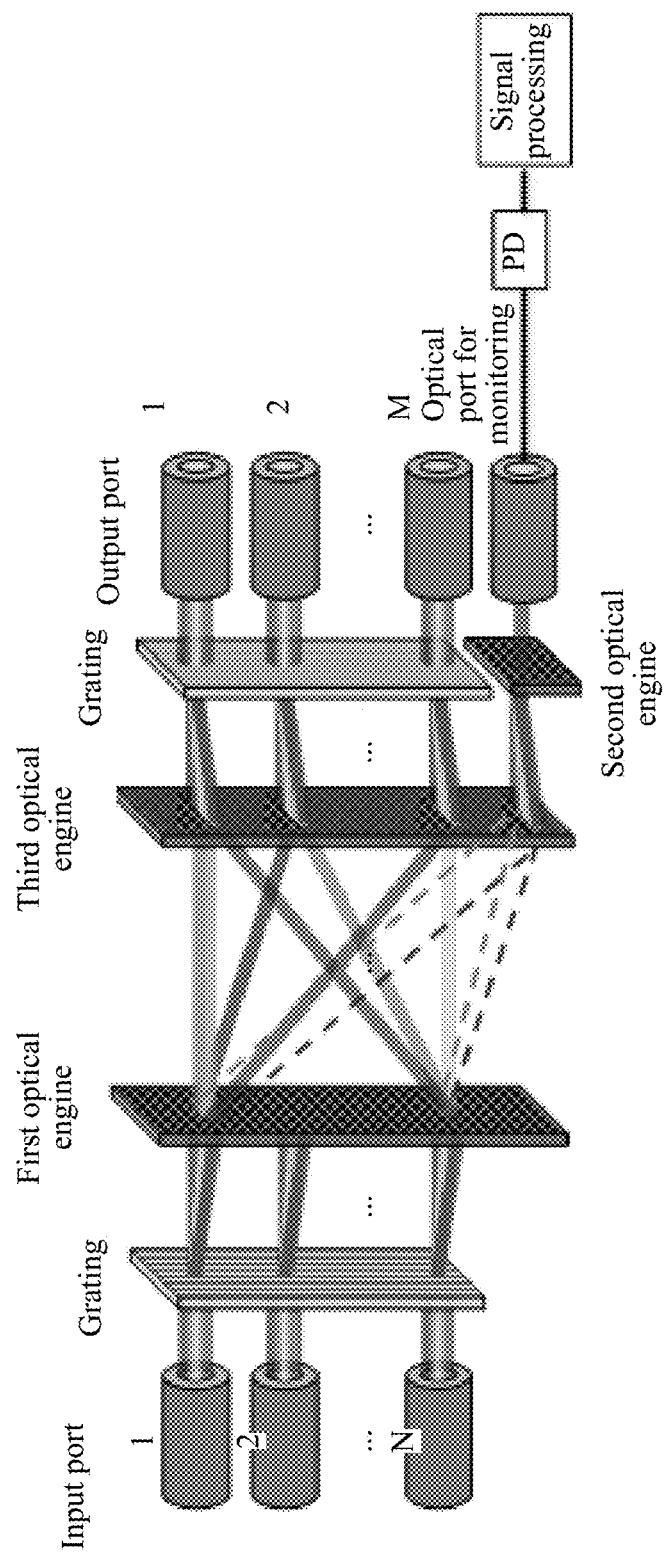
FIG. 3b is a schematic principle diagram of a basic optical path in an N×M WSS structure to which a method is applicable according to an embodiment of the present disclosure.

Second, when the method provided in this embodiment of the present disclosure is applied to a multiple-input multiple-output (N×M WSS) WSS structure, there are two types of N×M WSS. A role of a first type of N×M WSS (where a specific structure is shown in FIG. 3a) is that an optical signal of any output port may come from any input port or is a combination of signals from a plurality of input ports. A second type of N×M WSS structure includes N input ports and M output ports, and an output signal of the M output ports can come from only one of the N ports. The two cases are separately described in detail below:

1. For the first type of N×M WSS structure, because there are a plurality of input ports, an input port at which a multi-wavelength signal is monitored needs to be determined, and light of which wavelength in the multi-wavelength signal is monitored also needs to be determined. Therefore, based on step 101 and step 102, it is also needed to further sift out, in the following manner, a particular multi-wavelength signal that needs to be monitored from multi-wavelength signals corresponding to the plurality of input ports. Therefore, to implement the method in this embodiment, in the method provided in this embodiment of the present disclosure, the WSS structure includes the first optical engine, the second optical engine, and a third optical engine (specifically, as shown in FIG. 3b). A specific implementation of determining the particular multi-wavelength signal in the multi-wavelength signals corresponding to the plurality of input ports may be: before the monitored signal is input to the second optical engine disposed at the output-side grating, the method further includes the following steps.

A1: Control the monitored signal to pass through the third optical engine, where the third optical engine is disposed between the first optical engine and the second optical engine.

A2: Determine, in the plurality of input ports, a first input port corresponding to the monitored light.

The method in this embodiment is applied to the WSS structure including the plurality of input ports. Therefore, monitoring a signal corresponding to which input port at a specific time point needs to be determined, and the first input port corresponding to the finally output monitored light needs to be determined.

A3: Determine a first transmitted signal and a first monitored signal that are formed after the WDM signal transmitted from the first input port is split after passing through the first optical engine.

A4: Control, based on an incidence angle at which the first monitored signal is incident to the third optical engine, the third optical engine to rotate in a port plane, so that the first monitored signal is output to the second optical engine from the third optical engine, and the monitored light that is output from the second optical engine is input to a preset output port.

In this embodiment, a final effect to be achieved through rotation of the third optical engine in the port plane is that: the first monitored signal is sifted out from monitored signals from the plurality of input ports, and it is ensured that an emergence direction, in the port plane, of the monitored light that is output after the first monitored signal passes through the second optical engine corresponds to the output port. Therefore, when the third optical engine is controlled to rotate in the port plane, reference needs to be made to the incidence angle of the first monitored signal and a final position of the output port of the monitored light, to ensure that the monitored light to be monitored is output from a particular output port at a particular time point.

A specific implementation of applying the method provided in this embodiment of the present disclosure to the first type of N×M WSS structure is described below with reference to a specific structural accompanying drawing.

In this embodiment, compared with the 1×N WSS structure, a multi-port WSS device requires optical engines of two stages (the first optical engine and the third optical engine shown in FIG. 3a). In correspondence to a device including N input ports, the first optical switching engine includes N rows of flares, and each row of flare is spread out in a wavelength direction. Any wavelength from any input port may be mapped to the third optical switching engine through switching of the first optical engine. The third optical engine is configured to switch (performing optical path deflection on) a signal mapped to an area on the engine, to couple the signal to a preset output port for output.

An N×M WSS structure provided in an embodiment of the present disclosure is shown in FIG. 3b. After WDM light entering from the N input ports passes through apparatuses such as a collimation lens array, a grating, and a lens, the WDM light is spread out in a wavelength direction, arranged into N rows, and transmitted to the first optical engine. Then, a light splitting operation is performed on a signal of each wavelength in each row of flare on the first optical engine by using a phase algorithm. An incident signal of each wavelength is divided into two parts at a specified light splitting ratio. One part is a transmitted signal, and the other part is a monitored signal. A direction of the transmitted signal depends on an output port corresponding to the transmitted signal. For example, if a signal of a specific wavelength needs to be output from a second output port, a phase of the first optical engine is controlled, so that the signal of the specific wavelength is mapped to a position that is on the third optical engine and that corresponds to the second output port. Monitored signals are output by using a same output port. Therefore, all the monitored signals are mapped to a particular position on the third optical engine. In addition, a direction of the monitored signal corresponding to each input port depends on a position of a flare that is on the third optical engine and that corresponds to an output port of monitored light.

The monitored signals corresponding to the input ports are all mapped to a same particular position area on the third optical engine, but incidence angles in the port plane are different. Therefore, when the third optical engine is controlled to rotate in the port plane, an input port from which a monitored signal is to be output may be selected.

After the third optical engine determines a monitored signal of a specific input port, the monitored signal is mapped to the second optical engine. The second optical engine disposed at the output-side grating rotates in the wavelength direction to select monitored light of a particular wavelength for output.

Figure 3C:
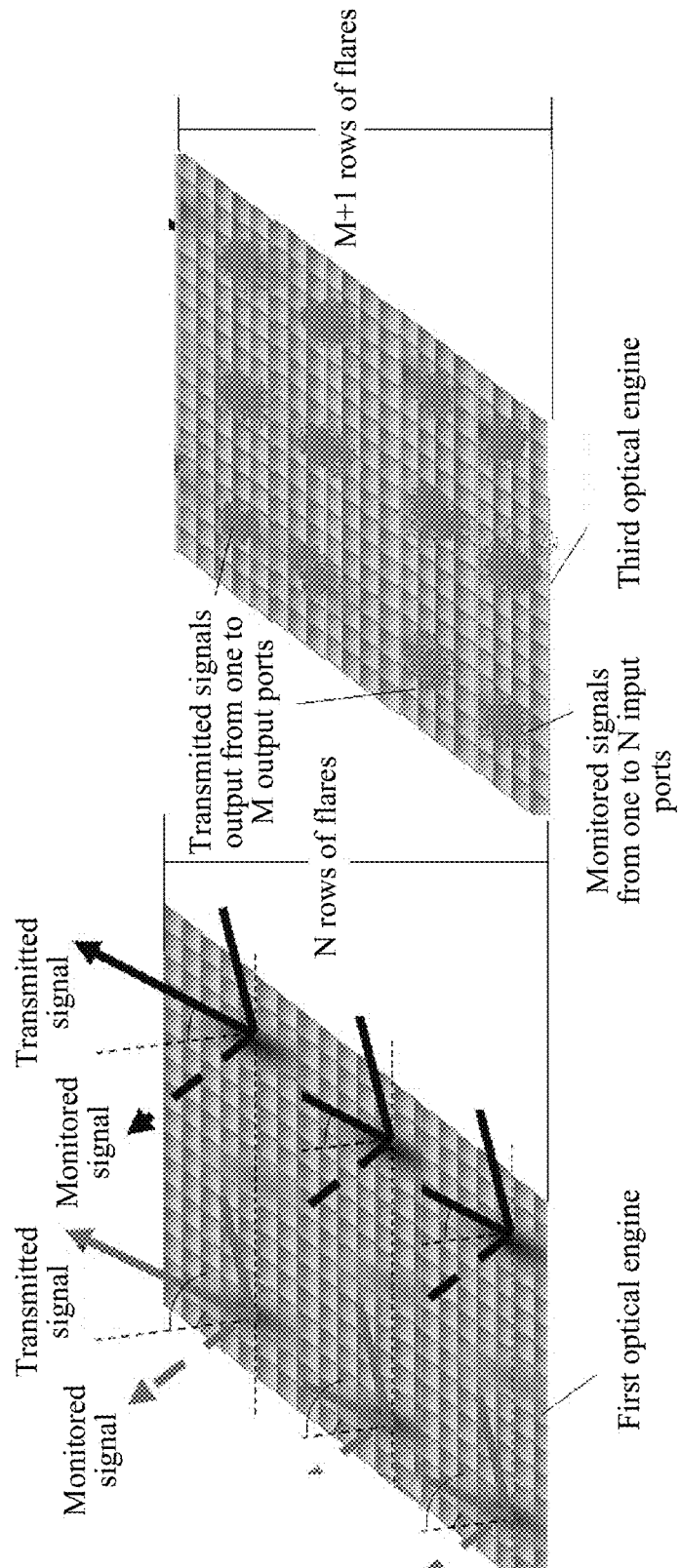
FIG. 3c is a schematic diagram of positions of each flare on a first optical engine and a third optical engine in a method according to an embodiment of the present disclosure.

Positions of each flare on the first optical engine and the third optical engine are shown in FIG. 3c. The first optical engine includes N rows of flares, respectively corresponding to WDM signals of the N input ports. The third optical engine includes M+1 rows of flares. M rows correspond to optical signals of the M output ports, and the other row of flare corresponds to monitored signals from 1 to N input ports. It is learned from the figure that for an optical wavelength channel $\lambda_k$, a flare of the optical wavelength channel $\lambda_k$ corresponds to the monitored signals from the N input ports (at different incidence angles).

2. For the second type of N×M WSS structure, the method provided in this embodiment of the present disclosure is applicable to a WSS structure shown in FIG. 4. The WSS structure includes the first optical engine, the second optical engine, and a fourth optical engine. After the first optical engine splits the WDM signal into two parts, the monitored signal corresponding to each input port is input to a particular position on the second optical engine. The second optical engine can output monitored light of only a particular wavelength. However, the monitored light of the particular wavelength includes signal light of a same wavelength that is from the plurality of input ports. For example, if red light that is input from a first input port needs to be monitored, the monitored light that is output from the second optical engine includes red light in WDM signals input from all the input ports. To monitor monitored light of a particular wavelength at a particular port, a beam of monitored light needs to be further selected from the monitored light that is output from the second optical engine. Monitored light of a particular wavelength is specifically selected by using the fourth optical engine. A specific implementation may be:

B1: Control the monitored light to pass through the fourth optical engine.

B2: Determine, in the plurality of input ports, a second input port to be monitored, and determine, in the monitored light, monitored signal light that is input from the second input port.

B3: Control, based on an incidence angle at which the monitored signal light is incident to the fourth optical engine, the fourth optical engine to rotate in a port plane, so that the monitored signal light is output from the fourth optical engine and is input to a preset output port.

A specific implementation of applying the method provided in this embodiment of the present disclosure to the second type of N×M WSS structure is described below with reference to a specific structural accompanying drawing.

Figure 4:
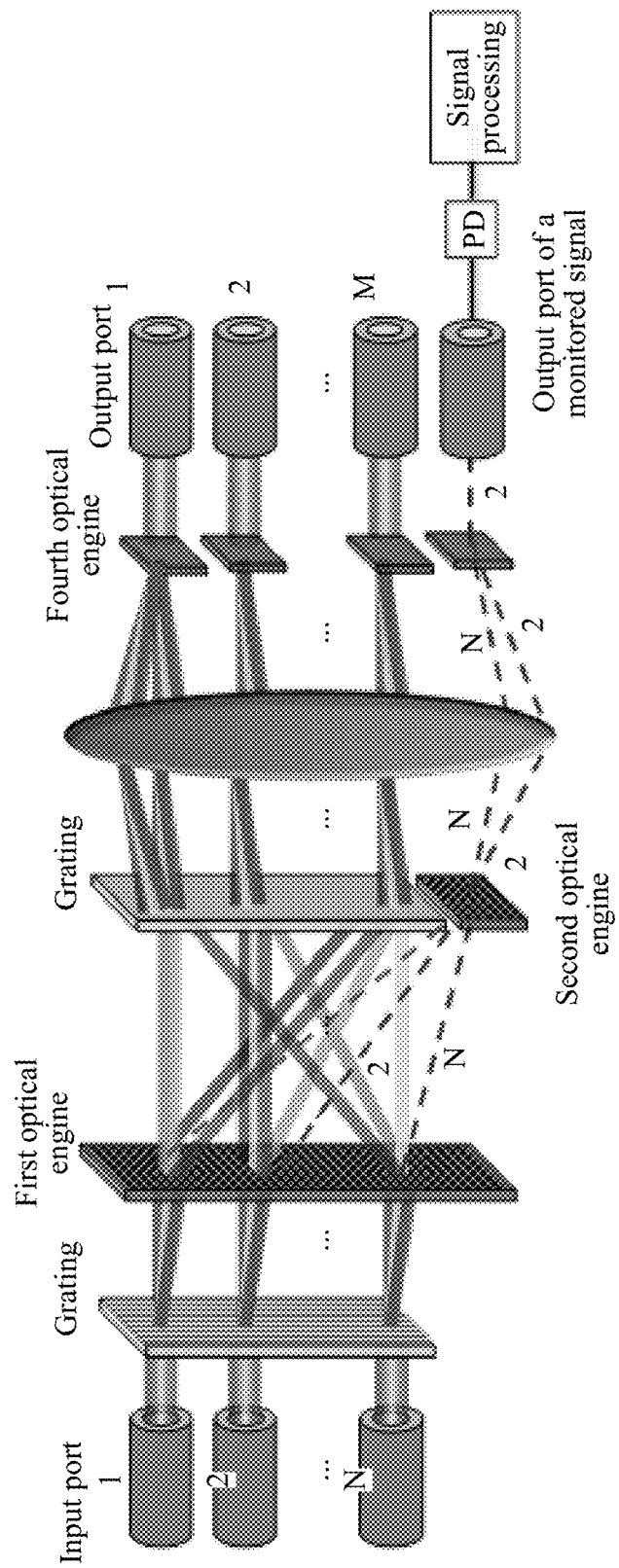
FIG. 4 is a schematic principle diagram of a basic optical path in another N×M WSS structure to which a method is applicable according to the present disclosure.

In an existing WSS structure, the output-side grating is in front of the fourth optical engine. When an optical signal obtained through optical multiplexing that is output from the first optical engine is mapped to the fourth optical engine, a role of the fourth optical engine is to select an input port from which a multiplexed signal is to be output and selection cannot be performed for each wavelength. Therefore, a signal wavelength can be selected based on the second optical engine newly added to the output-side grating in this solution of the present disclosure. A specific structure is shown in FIG. 4. A specific implementation of the method may be:

An N×M WSS structure according to an embodiment of the present disclosure is shown in FIG. 4. After WDM light entering from the N input ports passes through apparatuses such as a collimation lens array, a grating, and a lens, the WDM light is spread out in a wavelength direction, arranged into N rows, and transmitted to the first optical engine. Then, a light splitting operation is performed on a signal of each wavelength in each row of flare on the first optical engine by using a phase algorithm. An incident signal of each wavelength is divided into two parts at a specified light splitting ratio. One part is a transmitted signal, and the other part is a monitored signal. A direction of the transmitted signal depends on an output port corresponding to the transmitted signal. A phase of the first optical engine is controlled, so that a monitored signal from each input port is mapped to a position that is on the second optical engine and that corresponds to an output port of the monitored light.

After the monitored signal corresponding to each input port is mapped to a particular position on the second optical engine, the second optical engine rotates in the wavelength plane to sift out monitored light of a particular wavelength from each monitored signal for output, and maps the monitored light to a particular position on the fourth optical engine.

The monitored light of the particular wavelength that corresponds to each input port is mapped to the particular position on the fourth optical engine. Therefore, when the fourth optical engine is controlled to rotate in the port plane, an input port from which monitored light of a particular wavelength is to be output may be selected.

According to the method provided in this embodiment of the present disclosure, one stage of optical engine is added based on the original WSS structure to select signal light to be monitored, thereby effectively improving a fault monitoring speed of the WSS structure.

In addition, in the method provided in this embodiment of the present disclosure, the first optical engine on which phase adjustment is performed processes an entire flare of the WDM signal without dividing the flare into two parts for processing. In this way, light splitting processing may be performed on the WDM signal at any ratio, and it is ensured that performance impact, such as insertion loss, on the original signal is minimal.

Embodiment 2

Figure 5:
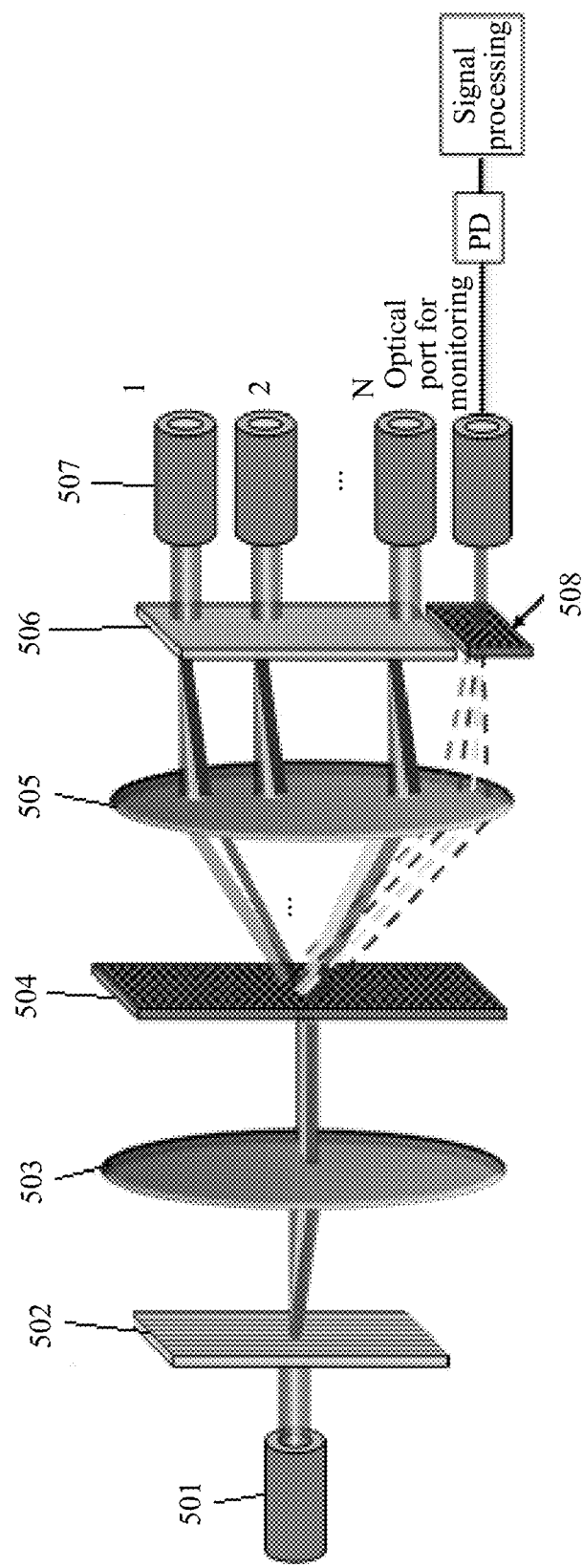
FIG. 5 is a schematic structural diagram of a wavelength selective switch according to an embodiment of the present disclosure.

As shown in FIG. 5, an embodiment of the present disclosure provides a wavelength selective switch WSS. The WSS includes an input port 501, an incidence grating 502, an input-end spherical lens 503, a first optical engine 504, an output-end spherical lens 505, an output-side grating 506, and an output port 507.

The input port 501 is configured to send an input WDM signal to the incidence grating.

The incidence grating 502 is configured to respectively diffract signals of wavelengths in the received WDM signal to the input-end spherical lens at different diffraction angles.

The input-end spherical lens 503 is configured to allow the signals of wavelengths to be incident, in parallel, to different positions or areas on the first optical engine.

The first optical engine 504 is configured to perform phase encoding modulation based on the input port corresponding to the signals of wavelengths, and output the signals of wavelengths to the output-end spherical lens at different angles.

The output-end spherical lens 505 is configured to output the signals of wavelengths to the output-side grating.

The output-side grating is configured to output the signals of wavelengths from different the output ports.

In this solution provided in this embodiment of the present disclosure, the WSS further includes a second optical engine 508. The second optical engine 508 is disposed at the output-side grating 506. Based on a structure provided with the second optical engine 508, the first optical engine 504 is further configured to split a signal of any wavelength in the signals of wavelengths into a transmitted signal and a monitored signal, and output the transmitted signal and the monitored signal at different emergence angles in a direction of the output port, so that the monitored signal is input to the second optical engine 508.

Correspondingly, the second optical engine 508 is configured to determine, in the monitored signal, monitored light of a specified wavelength that currently needs to be monitored, and rotate in a wavelength plane of the WDM signal based on an incidence angle at which the monitored light is incident to the second optical engine 508 and an emergence angle at which the monitored light is output from the second optical engine 508, so that the monitored light is output from the second optical engine at a preset angle.

In a specific application environment, the WSS includes a plurality of implementation structures, generally including: one input signal corresponds to a plurality of output signals, namely, single-input multiple-output (1×N WSS); or a plurality of input signals correspond to a plurality of output signals, namely, multiple-input multiple-output (N×M WSS). For a WSS structure including a plurality of input ports, a specific implementation is different. The specific implementation is as follows:

First, a role of the N×M WSS is that an optical signal of any output port may come from any input port or is a combination of signals from a plurality of input ports. Therefore, the wavelength selective switch WSS (where a structure is shown in FIG. 3b) includes:

a third optical engine, where the third optical engine is disposed between the first optical engine and the second optical engine, and is configured to determine, in monitored light corresponding to the plurality of input ports, a first monitored signal; and rotate in a port plane based on an incidence angle at which the first monitored signal is incident to the third optical engine, so that the first monitored signal is output to the second optical engine from the third optical engine, and the monitored light that is output from the second optical engine is input to a preset output port.

Second, the N×M WSS structure includes N input ports and M output ports. An output signal of the M output ports can only come from one of the N ports. Therefore, the wavelength selective switch WSS (where a structure is shown in FIG. 4) includes:

a fourth optical engine, where the fourth optical engine is disposed between the output-end spherical lens and the output port, and is configured to rotate in a port plane based on an incidence angle at which monitored signal light is incident to the fourth optical engine, so that the monitored signal light is output and is input to a preset output port, where the monitored signal light is in the monitored light and is input from a second input port to be monitored.

Embodiment 3

Figure 6:
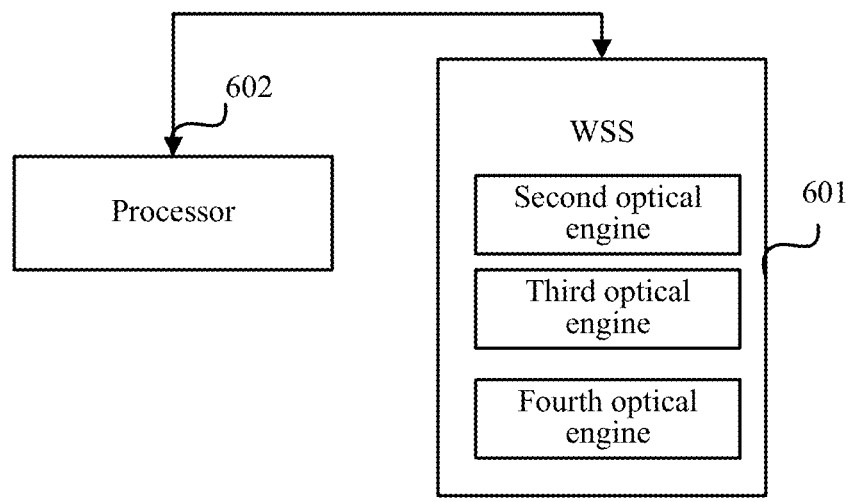
FIG. 6 is a schematic structural diagram of a signal monitoring apparatus for a wavelength selective switch according to an embodiment of the present disclosure.

As shown in FIG. 6, an embodiment of the present disclosure further provides a signal monitoring apparatus for a wavelength selective switch (WSS). The apparatus includes a wavelength selective switch 601 and a processor 602. The wavelength selective switch 601 specifically includes an input port, an incidence grating, an input-end spherical lens, a first optical engine, an output-end spherical lens, an output-side grating, and an output port, and the WSS further includes a second optical engine disposed at the output-side grating. The second optical engine is configured to sift out monitored light of a specified wavelength to be monitored.

The processor 602 is configured to: encode a phase of the first optical engine based on a WDM signal transmitted from the input port, so that the WDM signal is split into a transmitted signal and a monitored signal after passing through the first optical engine, and the transmitted signal and the monitored signal are output at different emergence angles in a direction of the output port, where the monitored signal is input to the second optical engine, and energy of the transmitted signal is greater than that of the monitored signal; determine, in the monitored signal, monitored light of the specified wavelength that currently needs to be monitored; and control, based on an incidence angle at which the monitored light is incident to the second optical engine and an emergence angle at which the monitored light is output from the second optical engine, the second optical engine to rotate in a wavelength plane of the WDM signal, so that the monitored light is output from the second optical engine at the emergence angle.

Optionally, the processor 602 is further configured to:

encode the phase of the first optical engine by using a formula $\varphi_{splitting}(y, \lambda) = \text{Arg}\{C_1(\lambda)I(y)e^{i\varphi_1(y, \lambda)} + C_2(\lambda)I(y)e^{i\varphi_2(y, \lambda)}\}$, where $C_1:C_2$ is an energy ratio of the transmitted signal to the monitored signal, and the function $\varphi_1(y, \lambda)$ and the function $\varphi_2(y, \lambda)$ respectively correspond to output directions of the transmitted signal and the monitored signal.

When the apparatus provided in this embodiment of the present disclosure is applied to a multiple-input multiple-output (N×M WSS) WSS structure, there are specifically two types of N×M WSS structures. A role of a first type of N×M WSS is that an optical signal of any output port may come from any input port or is a combination of signals from a plurality of input ports. A second type of N×M WSS structure includes N input ports and M output ports, and an output signal of the M output ports can come from only one of the N ports. For the two cases, the apparatus provided in this embodiment may be specifically as follows:

First, for the first type of multiple-input multiple-output WSS structure, the WSS further includes a third optical engine. The third optical engine is disposed between the first optical engine and the second optical engine. Correspondingly, the processor 602 is further configured to: before controlling the monitored signal to be input to the second optical engine disposed at the output-side grating, control the monitored signal to pass through the third optical engine; determine, in the plurality of input ports, a first input port corresponding to the monitored light; determine a first transmitted signal and a first monitored signal that are formed after the WDM signal transmitted from the first input port is split after passing through the first optical engine; and control, based on an incidence angle at which the first monitored signal is incident to the third optical engine, the third optical engine to rotate in a port plane, so that the first monitored signal is output to the second optical engine from the third optical engine, and the monitored light that is output from the second optical engine is output to a preset output port.

Second, for the second type of multiple-input multiple-output WSS structure, the WSS further includes a fourth optical engine. The fourth optical engine is disposed between the output-end spherical lens and the output port. Correspondingly, after controlling the monitored signal to be input to the second optical engine disposed at the output-side grating, the processor 602 is further configured to: control the monitored light to pass through the fourth optical engine; determine, in the plurality of input ports, a second input port to be monitored, and determine, in the monitored light, monitored signal light that is input from the second input port; and control, based on an incidence angle at which the monitored signal light is incident to the fourth optical engine, the fourth optical engine to rotate in a port plane, so that the monitored signal light is output from the fourth optical engine and is input to a preset output port.

The foregoing technical solutions in the embodiments of this application have at least the following technical effects or advantages:

According to the method and the apparatus that are provided in the embodiments of the present disclosure, one stage of optical engine is added based on the original WSS structure to select signal light to be monitored, thereby effectively improving a fault monitoring speed of the WSS structure.

In addition, in the method and the apparatus that are provided the embodiments of the present disclosure, the first optical engine on which phase adjustment is performed processes an entire flare of the WDM signal without dividing the flare into two parts for processing. In this way, light splitting processing may be performed on the WDM signal at any ratio, and it is ensured that performance impact, such as insertion loss, on the original signal is minimal.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A signal monitoring method for a wavelength selective switch (WSS), wherein after a wavelength division multiplexing (WDM) signal transmitted from an input port in the WSS passes through an incidence grating, light of wavelengths comprised in the WDM signal is incident to different positions on a first optical engine, the method comprising:

encoding a phase of the first optical engine based on the WDM signal to split the WDM signal into a transmitted signal and a monitored signal and output the transmitted signal and the monitored signal at different emergence angles towards an output port, wherein the monitored signal is input to a second optical engine disposed at an output-side grating, and energy of the transmitted signal is greater than energy of the monitored signal;

determining, in the monitored signal, monitored light of a specified wavelength that currently needs to be monitored; and controlling, based on an incidence angle at which the monitored light is incident to the second optical engine and an emergence angle at which the monitored light is output from the second optical engine, the second optical engine to rotate in a wavelength plane of the WDM signal and output the monitored light at a preset angle.

2. The method according to claim 1, wherein encoding a phase of the first optical engine based on the WDM signal comprises:

encoding the phase of the first optical engine by using a formula $\varphi_{splitting}(y, \lambda)=\mathrm{Arg}\{C_1(\lambda)I(y)e^{i\varphi_1(y, \lambda)}+C_2(\lambda)I(y)e^{i\varphi_2(y, \lambda)}\}$, where C1:C2 is an energy ratio of the transmitted signal to the monitored signal, I(y) is light intensity, and the function $\varphi_1(y, \lambda)$ and the function $\varphi_2(y, \lambda)$ respectively correspond to output directions of the transmitted signal and the monitored signal.

3. The method according to claim 1, wherein:
the WSS comprises a plurality of input ports; and
before the monitored signal is input to the second optical engine disposed at the output-side grating, the method further comprises:
  controlling the monitored signal to pass through a third optical engine, wherein the third optical engine is disposed between the first optical engine and the second optical engine,
  determining, in the plurality of input ports, a first input port corresponding to the monitored light,
  determining a first transmitted signal and a first monitored signal that are formed after the WDM signal transmitted from the first input port is split after passing through the first optical engine,
  controlling, based on an incidence angle at which the first monitored signal is incident to the third optical engine, the third optical engine to rotate in a port plane and output the first monitored signal to the second optical engine.

4. The method according to claim 1, wherein:
the WSS comprises a plurality of input ports;
the monitored light comprises signal light of a same wavelength comprised in a plurality of WDM signals input from the plurality of input ports; and
after the monitored signal is input to the second optical engine disposed at the output-side grating, the method further comprises:
  controlling the monitored light to pass through a fourth optical engine,
  determining, in the plurality of input ports, a second input port to be monitored, and determining, in the monitored light, monitored signal light that is input from the second input port, and
  controlling, based on an incidence angle at which the monitored signal light is incident to the fourth optical engine, the fourth optical engine to rotate in a port plane and output the monitored signal light from the fourth optical engine for input to a preset output port.

5. A wavelength selective switch (WSS), comprising:
an input port, an incidence grating, an input-end spherical lens, a first optical engine, a second optical engine, an output-end spherical lens, an output-side grating, and a plurality of output ports, wherein:
  the input port is configured to send a received wavelength division multiplexed (WDM) signal to the incidence grating;
  the incidence grating is configured to respectively diffract signals of wavelengths in the received WDM signal to the input-end spherical lens at different diffraction angles;
  the input-end spherical lens is configured to direct the signals of wavelengths to be incident, in parallel, to different positions on the first optical engine;
  the first optical engine is configured to:
    perform phase encoding modulation based on the input port corresponding to the signals of wavelengths, and output the signals of wavelengths to the output-end spherical lens at different angles, and
    split a signal of a wavelength in the signals of wavelengths into a transmitted signal and a monitored signal, and output the transmitted signal and the monitored signal at different emergence angles towards the output port for input to the output-spherical lens;
  the output-end spherical lens is configured to output the signals of wavelengths to the output-side grating and output the monitored signal to the second optical engine;
  the output grating is configured to output the signals of wavelengths to the output ports; and
the second optical engine is configured to:
  determine, in the monitored signal, monitored light of a specified wavelength that currently needs to be monitored, and
  rotate in a wavelength plane of the WDM signal based on an incidence angle at which the monitored light is incident to the second optical engine and an emergence angle at which the monitored light is output from the second optical engine and output the monitored signal at a preset angle.

6. The WSS according to claim 5, further comprising:
a plurality of input ports;
a third optical engine disposed between the first optical engine and the second optical engine, and configured to:
  rotate in a port plane based on an incidence angle at which a first monitored signal corresponding to the monitored light is incident to the third optical engine and output the first monitored signal to the second optical engine.

7. The WSS according to claim 5, further comprising:
a plurality of input ports, and wherein the monitored light comprises signal light of a same wavelength comprised in a plurality of WDM signals input from the plurality of input ports; and
a fourth optical engine disposed between the output-end spherical lens and the output port, and configured to:
  rotate in a port plane based on an incidence angle at which monitored signal light is incident to the fourth optical engine and the monitored signal light for input to a preset output port, and wherein the monitored signal light is in the monitored light and is input from a second input port to be monitored.

8. A signal monitoring apparatus, comprising:
a wavelength selective switch (WSS) comprising an input port, an incidence grating, an input-end spherical lens, a first optical engine, an output-end spherical lens, an output-side grating, and an output port, and the WSS further comprises a second optical engine disposed at the output-side grating, wherein the second optical engine is configured to separate out monitored light of a specified wavelength to be monitored; and
a processor configured to:
  encode a phase of the first optical engine based on a WDM signal received from the input port to split the WDM signal into a transmitted signal and a monitored signal and output the transmitted signal and the monitored signal at different emergence angles towards the output port, wherein the monitored signal is input to the second optical engine, and energy of the transmitted signal is greater than energy of the monitored signal,
  determine, in the monitored signal, the monitored light of the specified wavelength that currently needs to be monitored; and
  control, based on an incidence angle at which the monitored light is incident to the second optical engine and an emergence angle at which the monitored light is output from the second optical engine, the second optical engine to rotate in a wavelength plane of the WDM signal and output the monitored light at the emergence angle.

9. The apparatus according to claim 8, wherein the processor is further configured to:

encode the phase of the first optical engine by using a formula $\varphi_{splitting}(y, \lambda) = \text{Arg}\{C_1(\lambda)I(y)e^{i\varphi_1(y, \lambda)} + C_2(\lambda)I(y)e^{i\varphi_2(y, \lambda)}\}$, wherein $C_1:C_2$ is an energy ratio of the transmitted signal to the monitored signal, I(y) is a light intensity, and the function $\varphi_1(y, \lambda)$ and the function $\varphi_2(y, \lambda)$ respectively correspond to output directions of the transmitted signal and the monitored signal.

10. The apparatus according to claim 8, wherein:

the WSS further comprises a plurality of input ports, and a third optical engine disposed between the first optical engine and the second optical engine; and before controlling the monitored signal to be input to the second optical engine disposed at the output-side grating, the processor is further configured to:

control the monitored signal to pass through the third optical engine, determine, in the plurality of input ports, a first input port corresponding to the monitored light, determine a first transmitted signal and a first monitored signal that are formed after the WDM signal transmitted from the first input port is split after passing through the first optical engine, and control, based on an incidence angle at which the first monitored signal is incident to the third optical engine, the third optical engine to rotate in a port plane and output the first monitored signal to the second optical engine for output to a preset output port.

11. The apparatus according to claim 8, wherein:

the WSS further comprises a plurality of input ports, and a fourth optical engine disposed between the output-end spherical lens and the output port;

the monitored light comprises signal light of a same wavelength that is comprised in a plurality of WDM signals input from the plurality of input ports; and after controlling the monitored signal to be input to the second optical engine disposed at the output-side grating, the processor is further configured to:

control the monitored light to pass through the fourth optical engine, determine, in the plurality of input ports, a second input port to be monitored, and determine, in the monitored light, monitored signal light that is input from the second input port, and control, based on an incidence angle at which the monitored signal light is incident to the fourth optical engine, the fourth optical engine to rotate in a port plane and output the monitored signal light for input to a preset output port.

* * * * *